(12) United States Patent
Vossmann et al.

(10) Patent No.: US 6,454,354 B1
(45) Date of Patent: Sep. 24, 2002

(54) DETENT FITTING FOR A VEHICLE SEAT

(75) Inventors: Gregor Vossmann, Vreden; Martin Becker, Wuppertal; Christoph Peters, Wermelskirchen; Diana Krug, Remscheid; Thorsten Osbahr, Mühlheim an der Ruhr, all of (DE)

(73) Assignee: Keiper GmbH & Co, Kaiserslautern (DE)

( * ) Notice: Subject to any disclaimer, the term of this patent is extended or adjusted under 35 U.S.C. 154(b) by 0 days.

(21) Appl. No.: 09/646,977

(22) PCT Filed: Jan. 15, 2000

(86) PCT No.: PCT/EP00/00291

§ 371 (c)(1),
(2), (4) Date: Sep. 25, 2000

(87) PCT Pub. No.: WO00/44582

PCT Pub. Date: Aug. 3, 2000

(30) Foreign Application Priority Data

Jan. 28, 1999 (DE) .......................................... 199 04 300
May 11, 1999 (DE) .......................................... 199 21 810
Jun. 19, 1999 (DE) .......................................... 199 28 148
Nov. 23, 1999 (DE) .......................................... 199 56 235

(51) Int. Cl.⁷ .................................................. B60N 2/02
(52) U.S. Cl. ..................................................... 297/367
(58) Field of Search ................................. 297/366, 367, 297/374, 376

(56) References Cited

U.S. PATENT DOCUMENTS

| 5,622,407 | A |   | 4/1997  | Yamada et al. |
| 6,007,153 | A |   | 12/1999 | Benoit et al. |
| 6,092,874 | A |   | 7/2000  | Kojima et al. |
| 6,112,370 | A | * | 9/2000  | Blanchard et al. |

FOREIGN PATENT DOCUMENTS

| DE | 44 41 159 A1 | 5/1995 |
| DE | 44 19 411 A1 | 12/1995 |
| DE | 197 15 855 A1 | 11/1997 |
| DE | 197 37 637 A1 | 3/1998 |
| DE | 198 14 225 A1 | 10/1998 |
| DE | 198 32 028 A1 | 1/1999 |
| DE | 198 55 499 A1 | 6/1999 |
| EP | 0 694 434 A1 | 1/1996 |
| EP | 0 720 930 A1 | 7/1996 |
| EP | 0 770 514 A1 | 5/1997 |
| EP | 0 978 413 A1 | 2/2000 |
| FR | 2 771 687 A1 | 6/1999 |
| GB | 2 078 294 A | 1/1982 |

* cited by examiner

*Primary Examiner*—Milton Nelson, Jr.
(74) *Attorney, Agent, or Firm*—Alston & Bird LLP

(57) ABSTRACT

In a locking mechanism for a vehicle seat, in particular an automobile seat with a lower member, an upper member supported by the lower member, and at least one locking element extending between the upper member and the lower member in a guideway, the guideway simultaneously forms a bearing for supporting the lower member and upper member.

22 Claims, 11 Drawing Sheets

DETENT FITTING FOR A VEHICLE SEAT

BACKGROUND OF THE INVENTION

The present invention relates to a locking mechanism for a vehicle seat, in particular for an automobile seat.

In a known locking mechanism for a vehicle seat, an upper member of the mechanism is supported on a bearing element, which is supported in a lower member of the mechanism. The bearing element, which is arranged in an assembly space between the upper member and the lower member of the mechanism and constructed as a complicated combination of collars, is used at the same time as a control cam element for moving two locking elements. The locking elements are pushed radially outward, while being guided in a guideway, for engaging the locking mechanism. The combined bearing and control cam element is mounted directly on a transmission bar. After installing the locking mechanism in an automobile seat, this transmission bar extends to the locking mechanism on the other side and to an adjustment device. By rotating the transmission bar, the bearing and control cam element rotates, thereby moving the locking elements.

SUMMARY OF THE INVENTION

It is an object of the present invention to improve a locking mechanism of a vehicle seat. According to one aspect of the invention, this object is accomplished by a locking mechanism having a lower member including a guideway with a bearing surface for engaging an upper member so that the upper member is supported by the lower member and the upper and lower members are relatively rotatable about a central axis. The locking mechanism further includes a locking element that is within a channel of the guideway and is driven radially away from the central axis by a control element in response to rotation of the control element, so that the locking element engages both the lower member and the upper member to restrict rotation of the upper member relative to the lower member.

The fact that the guideway forms the bearing for supporting the upper member permits supporting the upper member directly in or on the lower member of the mechanism without a bearing element as an intermediate support. With that, it is no longer necessary to use a bearing and control cam element of a complicated construction, which simplifies production of the locking mechanism and reduces its costs. Additionally, the guideway radially extends further outward than the known bearing and control cam element, so that a support occurs with a longer lever arm, which reduces the bearing forces. Preferably, the guideway is made integral with the lower member of the locking mechanism and supported in the upper member thereof, thereby simplifying production and increasing stability.

For a safe engagement of the locking mechanism, a gear rim that is preferably formed on one member of the mechanism in a boundary surface thereof cooperates with a locking element that is designed and constructed as a toothed segment. Preferably, two locking elements are provided. For a simple manufacture, it is advantageous for the boundary surface that comprises the gear rim to function as the bearing contact surface for the guideway. To effect an as satisfactory support as possible, the guideway preferably lies against the boundary surface over the largest portion of the sector range in the circumferential direction. Recessed sector ranges are left open, for example, for the locking elements or for accommodating springs.

The support of the upper member via the guideway permits using the space in the center of the locking mechanism for receiving the control element. As mentioned above, the control element moves the locking elements. To assist this movement, the control element is preferably spring-loaded. For applying the necessary force, a spring is provided preferably for each locking element. A control disk is preferably mounted to a transmission bar with the control element for moving the locking elements in the direction against the spring load.

In a preferred embodiment, means are provided for equalizing tolerances, so that a safe engagement of the locking mechanism is achieved. When each side of the automobile seat mounts a locking mechanism, and a common actuation occurs via a bar, the tolerance equalization means will, for example, see to it that both locking mechanisms engage, regardless as to whether different tooth positions in the locking mechanisms occur as a result of a play that is intentionally provided within a locking mechanism, or as a result of manufacturing tolerances. For example, the tolerance equalization means may also compensate for tolerances within a locking mechanism. The different tolerance equalization means may be provided individually or in any desired combinations. Preferably, a control element moves the locking elements. In this instance, the control element is moved by a bar, which transmits the movement of the control element from one side of the vehicle seat to the other side thereof. This effects a synchronous actuation of all existing locking elements. To make up for torsions of the bar, it is preferred to provide a play between the bar and the control element. For a simpler manufacture, it is advantageous to provide the play between a separately made transmission element, that is shorter than the bar and arranged on the bar, and the control element.

As a further tolerance equalization means, the control element can be designed and constructed as a cam plate, with a contoured control section for each existing locking element. In this instance, each contoured control section extends outward in a slightly spiral form with a constantly increasing radius. As a result, a partially engaged locking element is safely held until all the other locking elements are also engaged. Control cams accomplish a better transmission of force to the locking elements, which cooperate with the respective contoured control section.

Preferably, a control disk is provided for cooperating with each locking element. The control disk lies against the locking element laterally with respect to the direction of movement thereof, and controls the movement of the locking element, for example via projections and slots, in particular during disengagement. Preferably, the control disk is biased in the direction toward the locking element, namely in the axial direction in the case of a radially movable locking element. This ensures that the control disk remains in contact with the locking element, and thus, the projections and slots remain engaged for controlling the movement. The bias is realized, preferably by one or more resilient tongues, which are bent outward from the control disk, and which are simultaneously operative as a tolerance equalization means.

In a further, preferred embodiment, the locking mechanism comprises a means which restricts an effective operation of the locking element to certain angular positions between the upper and the lower member of the locking mechanism. This permits using the locking mechanism in automobile seats whose seat back should be adapted for free pivotal movement after disengagement and/or for movement to a reclined position, without having to actuate or hold the disengagement device constantly during the pivotal movement. This makes it easy to reach and to abandon likewise the foremost or rearmost angular position of the seat back.

In the reclined position, it is further ensured that the seat back is supported, and that the load is not transmitted via a locking mechanism with an unfavorable lever arm, which is inadvertently engaged barely above the reclined position.

Preferably, the locking element cooperates for purposes of engaging with one of the members of the locking mechanism. Outside of certain angular positions, the means keeps the locking element away from this member of the mechanism. This may occur, for example, by a retaining or return means, a guide plate control, individual stops, cams, or by a stop track, which extends over several connected angular positions. In the case of a radially operative locking element, the stop track cooperates preferably with an axially projecting detent of the locking element in order not to be directly in the flow of the engagement force, and to protect the effective engagement surface of the locking element, for example a gear tooth system. In this instance, the stop track can include radially different, far outside located sections, which serve as stops for the axially projecting detent.

Preferably, the stop track is arranged on the upper member of the locking mechanism, since in this instance the stop track rotates over the different angular positions along with the upper member, and can therefore be designed and constructed in a simpler manner. As a function of the number of locking elements, the stop track is accordingly shaped in rotational symmetry.

To have available individually adapted stop tracks, which can be easily exchanged or left off, if desired, the stop track can advantageously be provided on a separately constructed part, which is nonrotatably arranged on the upper member of the locking mechanism. In the case of an easy-to-make antirotation device, the separately constructed part comprises projections and/or receptacles, which cooperate with corresponding receptacles or projections of the upper member of the locking mechanism. To be able to continue the use of previously used parts, without increasing the overall depth and without providing a stop track, if need be, it will be of advantage, when the separately constructed part is, for example, a ring, which is seated in a recess of the upper member of the locking mechanism.

In a further, preferred embodiment, the locking mechanism comprises an element that can be coupled with either the lower member or the upper member of the mechanism. This permits a free pivotal movement of a mounted seat back with a memory function, i.e., after the free pivotal movement, the adjusted position is again reached. As a result of directly supporting the lower and upper members of the locking mechanism on the guideway without an intermediate bearing, it is no longer necessary to use a bearing and control cam element of a complicated construction, which simplifies production of the locking mechanism and reduces its cost. Since the guideway extends radially further outward than the known bearing and control cam element, a support occurs with a longer lever arm, which reduces the bearing forces.

The coupling with the upper and lower members of the mechanism may occur by arms, for example, spring arms. Preferably, these arms can be disconnected from the respective member by a common shift plate. To actuate the shift plate, it is preferred to provide a rotatable actuation sleeve, which is nonrotatably connected to the shift plate arranged inside the locking mechanism and to a lever arranged outside of the locking mechanism. For a compensation of axial tolerances, it is possible to provide third spring arms.

Preferably, the locking element comprises a detent, and a guide plate with a step is provided, over which the detent moves during a free pivotal movement of the locking mechanism, so that the locking element does not engage. To receive the detent, while the locking mechanism engages, the guide plate may comprise a recess. Preferably, this guide plate forms at the same time the engageable element that can be coupled with the aforesaid arms.

An automobile seat of the present invention comprises at least one, preferably two of the locking mechanisms according to the invention, which are interconnected via the transmission bar.

BRIEF DESCRIPTION OF THE DRAWINGS

In the following, the invention is described in greater detail with reference to four embodiments illustrated in the drawing, in which.

DETAILED DESCRIPTION OF THE INVENTION

Figure 1:
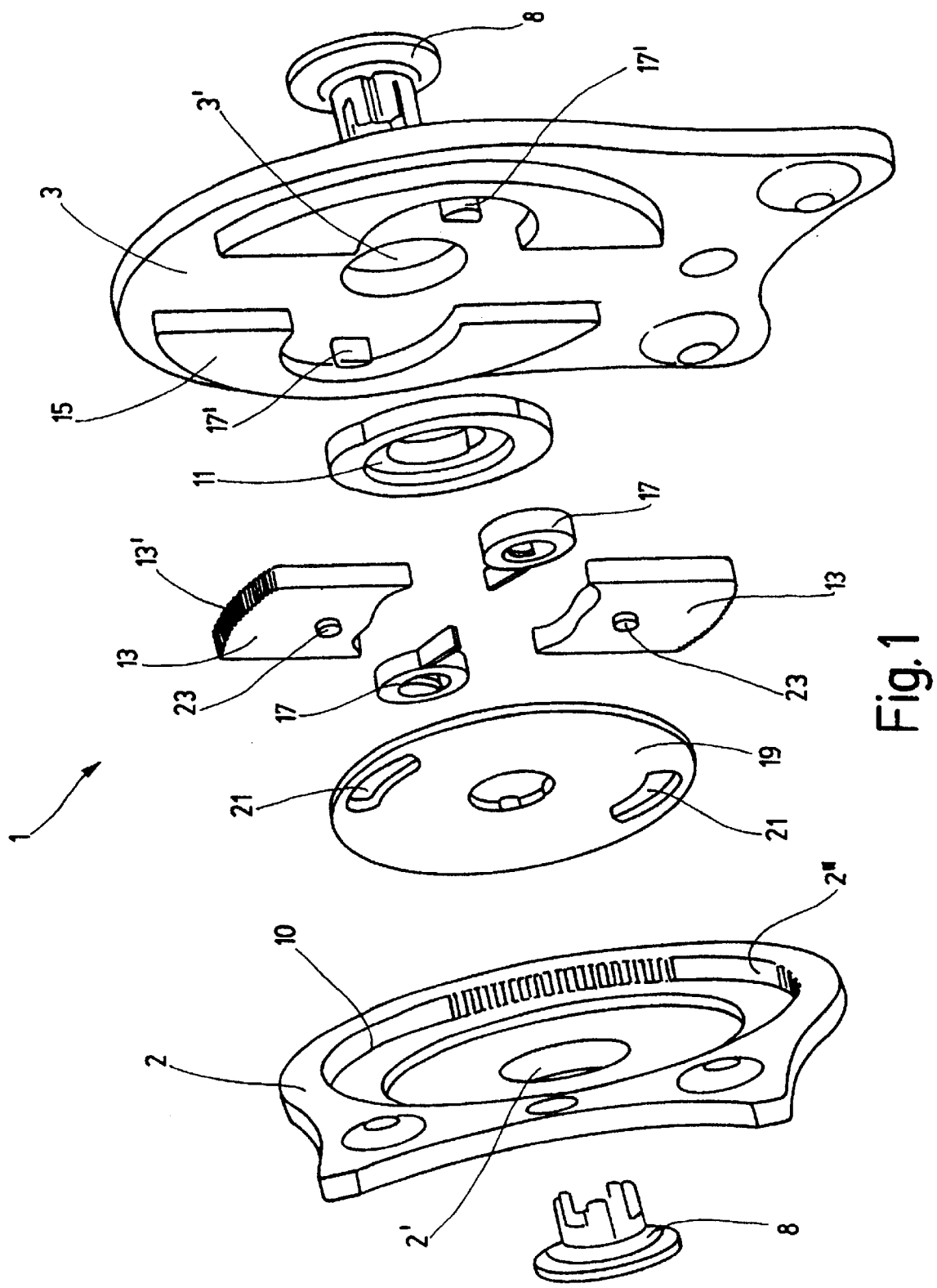
FIG. 1 illustrates perspective views of the individual components of a first embodiment, wherein the two components on the left are shown from a different perspective than the other components.
Figure 2:
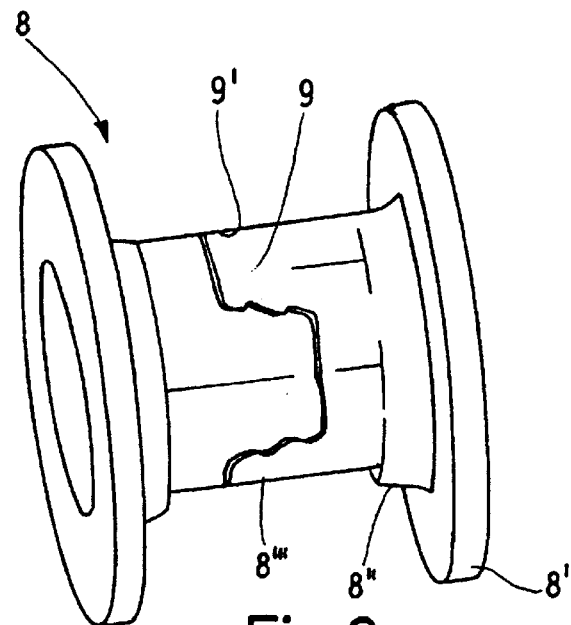
FIG. 2 is a perspective view of an axial safety device.
Figure 3:
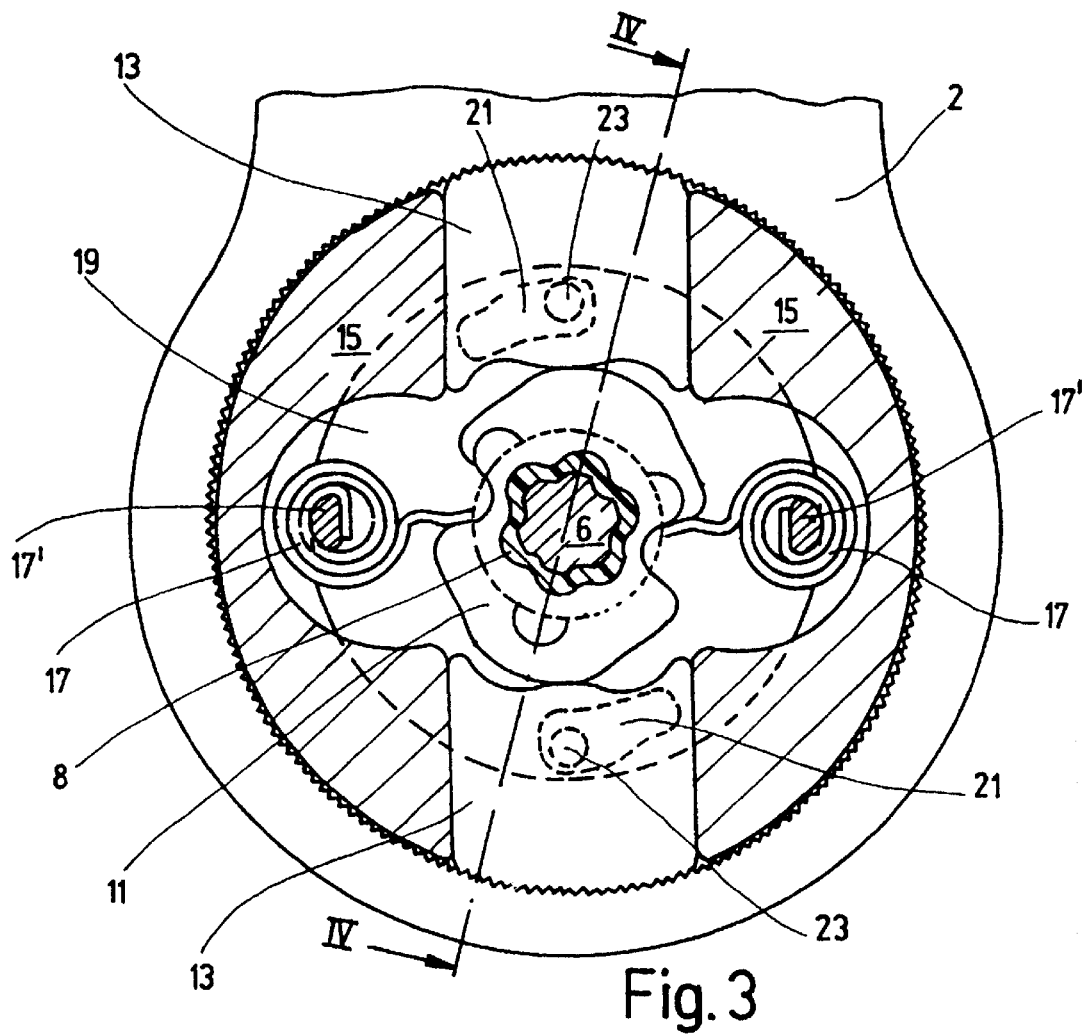
FIG. 3 is a radially sectioned view of the embodiment along line III—III of FIG. 4.
Figure 4:
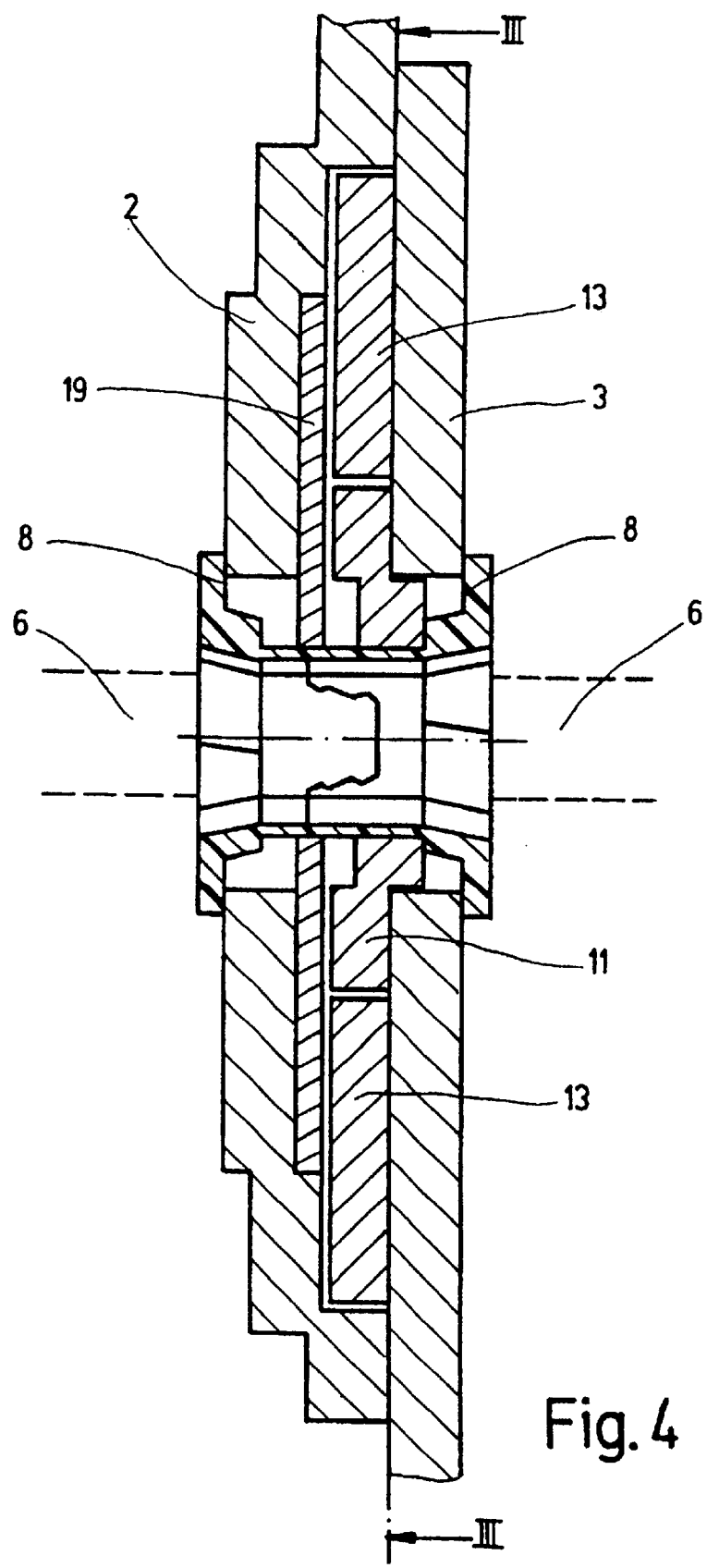
FIG. 4 is an axially sectioned view of the embodiment along line IV—IV of FIG. 3.
Figure 5:
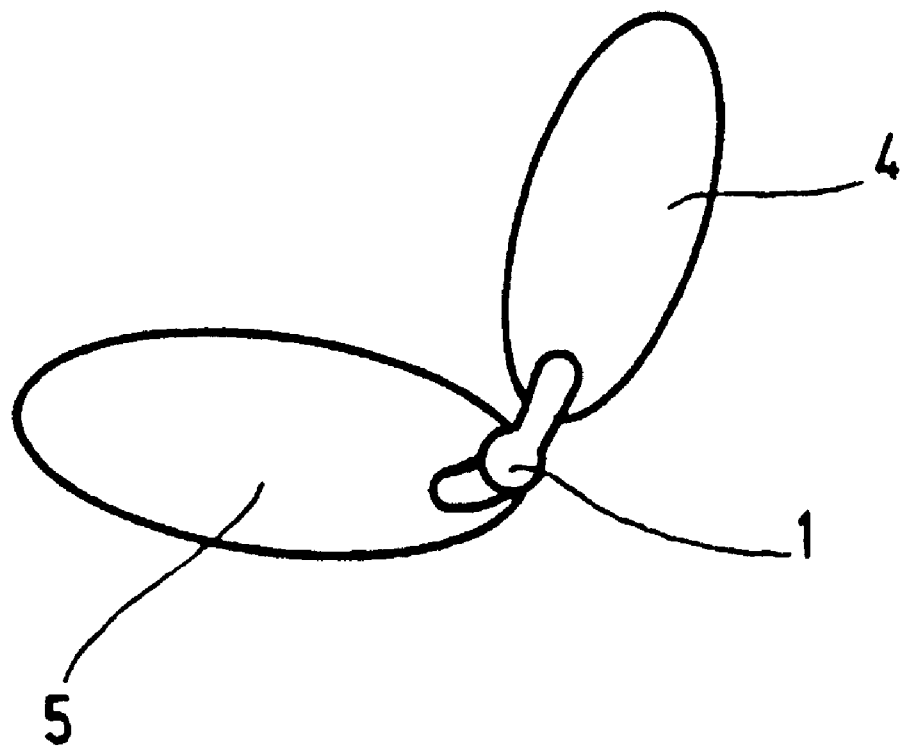
FIG. 5 is a schematic partial view of an automobile seat of the present invention.
Figure 6:
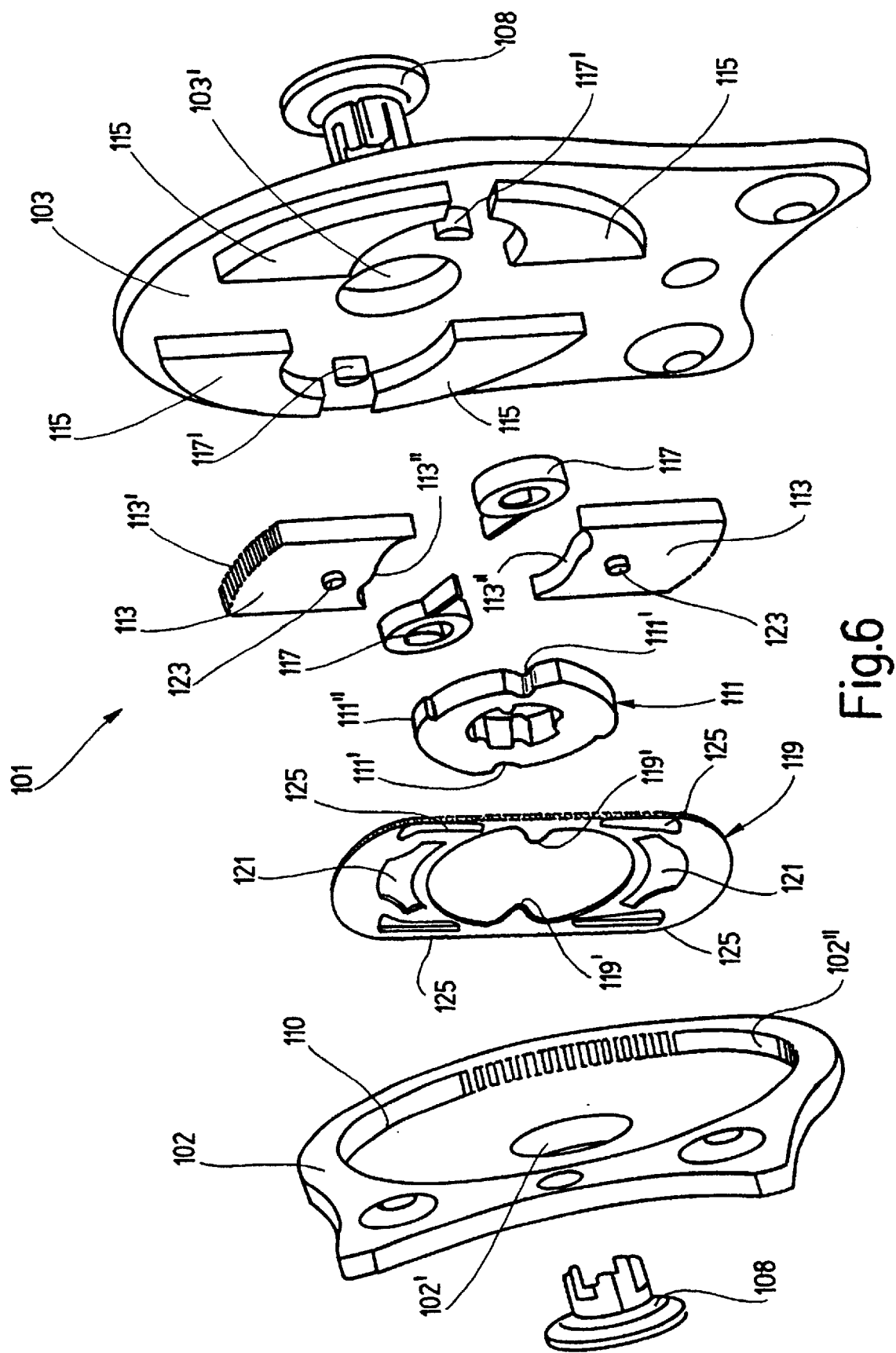
FIG. 6 is an exploded view of the individual components of a second embodiment, wherein the two components on the left are shown from a different perspective than the other components.

The first embodiment relates to a locking mechanism of an automobile seat, generally indicated at 1, which comprises an upper member 2 and a lower member 3. One locking mechanism 1 is arranged on each side of the automobile seat. A seat back 4 secured to the upper member 2 is connected with a seat structure 5 of the automobile seat by the two locking mechanisms 1. The two locking mechanisms 1 are interconnected by a transmission bar 6, which is only indicated in FIG. 4.

The upper member 2 and lower member 3 are each provided in the center of a disk-shaped section with a bore 2' and 3', respectively, which form a passageway for transmission bar 6. From the outside of upper member 2 and lower member 3 respectively, namely from each side facing away from respectively the other lower member 3 and other upper member 2, one half each of a continuous axial safety device 8 extends through the bores 2' and 3'. As a transmission element with an internal transmission profile, the axial safety device 8 surrounds the likewise profiled transmission bar 6.

The two identically constructed plastic halves of axial safety device 8 comprise each a disk-shaped flange section 8', which lies with its annular inner front end flat against the corresponding outside of upper member 2 and lower member 3. The flange section 8' prevents the axial safety device 8 from displacing, and likewise avoids at the same time during the assembly and a transportation of locking mechanism 1 that the upper member 2 and lower member 3 displace in the axial direction. However, it does not prevent the upper member 2 from rotating relative to the lower member 3. For the transmission of axial forces, as occur during the use of locking mechanism 1, sheet metal holders are provided, which are not shown in the drawing. The flange section 8' also acts as a seal against the entry of varnish, when the locking mechanism 1 is dip varnished.

Toward the inner front end of flange section 8', a slightly conical intermediate section 8" follows, which has smaller diameters than flange section 8', i.e., it is radially set back therefrom. The intermediate section 8" has likewise a smaller diameter than the bores 2' and 3' of upper member 2 and lower member 3, so that same are not seated on the intermediate section 8".

Toward the inner front end of intermediate section 8", the narrowed portion thereof is followed by a transmission section 8''', which is profiled both on its radially outer surface and on its radially inner surface. With its radially inner surface, the transmission section 8''' lies against transmission bar 6. For an easy assembly, the profiles of transmission bar 6 and transmission section 8''' may be rotationally asymmetric.

In the axial direction, the transmission section 8" comprises three finger-shaped projections 9 with three recesses 9' of the same shape, which are all provided on their edges with a saw-toothlike, coarse gear tooth system. During the assembly, the two halves of axial safety device 8 are inserted into each other with their transmission sections 8''', 60° out of phase, so that each finger-shaped projection 9 comes to lie in a recess 9' of the opposite half. The saw-toothlike teeth of the gear tooth system direct with their short flanks toward the respective flange section 8', the short flanks being made slightly hook-shaped. When the two halves of the axial safety device 8 are inserted into each other, the short flanks of the saw-toothlike teeth are resiliently pushed on top of one another due to the elasticity of the plastic material, for purposes of then engaging behind one another, so that the gear tooth system forms a clip connection.

On its inner side facing the lower member 3 of the mechanism, the upper member 2 has an annular cavity that extends around bore 2'. Between the two members 2 and 3 of the mechanism, this annular cavity defines an assembly space 10, which accommodates a plurality of parts described in the following. A peripheral boundary surface of assembly space 10 formed in the upper member 2 is indicated at 2".

A cam plate 11 in the form of a circular disk with two cams 180° out of phase on its outer circumference is located on the axial safety device 8 within the assembly space 10. The clipped-together transmission sections 8''' of the axial safety device 8 engage in nonrotating manner the bearing opening of cam plate 11, so that the cam plate 11 is rotatable by transmission bar 6 via the axial safety device 8, which acts as a transmission element. Via a step projecting in the axial direction, the cam plate 11 is supported in bore 3' of lower member 3.

In the same plane as cam plate 11, but at a greater radial distance from axial safety device 8, the assembly space 10 accommodates two flat toothed segments 13 serving as locking elements. The toothed segments 13 are arranged 180° out of phase (i.e. radially symmetric to each other), and movable in the radial direction. On its radially outer end, each toothed segment 13 comprises on its edge a gear tooth system 13', and on its radially inner end it is provided on its edge with a contoured profile, which cooperates with cam plate 11 that acts as a control element. Between gear tooth system 13' and the contoured profile, the edge surfaces of tooth segment 13 extend parallel to each other.

The lower member 3 of the mechanism comprises a guideway 15, which extends into the assembly space 10 for receiving toothed segments 13. The guideway 15 consists of two approximately C-shaped segments in facing relationship, which form in the outer region a channel for each toothed segment 13, and offer in the inner region, around axial safety device 8 with cam plate 11, a space for accommodating respectively one spiral spring 17. In this arrangement, the toothed segment 13 lies with its parallel edge surfaces against the side walls of the channel. Each of the two spiral springs 17 is supported at its inner end on a pin 17' within the inner region of guideway 15, and at its outer end on the circumference of cam plate 11. The spiral springs 17 rotate the cam plate 11 that acts as a control element, so that its cams push toothed segments 13 radially outward by means of their contoured profile.

A drive disk, hereafter control disk 19, is arranged inside the assembly space 10 in a shallow cavity of upper member 2 between the plane with the toothed segments 13 and the material portion of upper member 2 surrounding bore 2'. In the illustrated embodiment, the control disk 19 is mounted on the axial safety device 8. However, it may also be supported on a projection of cam plate 11. The control disk 19 rotates along with transmission bar 6, when same is rotated. In its radially outer region, the disk-shaped control disk 19 is provided with two diametrically opposite, elongate slots 21, which extend on their radially outer side obliquely to the circumference of control disk 19. From each toothed segment 13, a detent 23 projects on the side facing the upper member 2 of the locking mechanism. In the assembled state, this detent 23 comes to lie inside a slot 21.

When the toothed segments 13 are radially pushed outward by the rotation of cam plate 11, the control disk 19 rotates along therewith, so that the detents 23 inside slots 21 are pushed radially outward. During a rotation in the opposite direction, the control disk 19 pulls the toothed segments 13 radially inward via its slots 21 and via detents 23.

In the assembled state of the locking mechanism 1, the guideway 15 contacts in the circumferential direction with its outer surface boundary surface 2" of assembly space 10, thereby supporting the upper member 2 directly on guideway 15 and, thus, on the lower member 3 of the mechanism. The boundary surface 2" comprises a gear rim, which cooperates with the gear tooth system 13' of toothed segments 13, when the toothed segments 13 are pushed outward by cam plate 11. As soon as the gear rim of upper member 2 and the gear tooth system 13' of toothed segment 13 mesh with each other, the locking mechanism will be engaged, i.e., the upper and lower members 2 and 3 can no longer be moved relative to each other. When the control disk 19 retracts the toothed segments 13, it will be possible to rotate upper member 2 and lower member 3 relative to each other. In this instance, the guideway 15 slides along the boundary surface 2" of assembly space 10.

In a modified embodiment, only one a part of the boundary surface 2" is provided with a gear rim. In this instance, the toothed segments 13 can mesh only in certain angular positions of upper member 2 and lower member 3, i.e., the locking mechanism 1 engages only in these angular positions.

The second embodiment relates to a locking mechanism 101. Unless otherwise specified in the following, its components correspond to the first embodiment, and are therefore provided with numerals increased by 100.

A seat back of the second embodiment is variable in its inclination by rotating members 102 and 103 of the mechanism relative to each other, and it is capable of pivoting freely for purposes of facilitating access to the rear seat. An axial safety device 108 is supported in bores 102' and 103' of members 102 and 103, and surrounds as a transmission element with an internal transmission profile a likewise profiled transmission bar 106. For an easy assembly, the profiles of transmission bar 106 and axial safety device 108 are made rotationally asymmetrical, namely, as shown in the cross sectional view of the embodiment with five teeth at an angle of 60° relative to one another.

On its inner side facing lower member 103, the upper member 102 of the mechanism comprises around bore 102' an annular cavity, which defines an assembly space 110. A boundary surface formed in upper member 102 and extending in the circumferential direction of assembly space 110 is indicated at 102", and comprises a gear tooth system at least in sections. A cam plate 111, which acts as a control element, is located within assembly space 110 on axial safety device 108. Two flat toothed segments 113, which have a smaller thickness than cam plate 111, are arranged within assembly space 110 in the same plane as cam plate 111 at a greater radial distance from axial safety device 108.

The two toothed segments 113 are arranged 180° out of phase. They are capable of moving in the radial direction, and they are guided by four guide segments 115. On its radially outer end, each toothed segment 113 comprises on its edge a gear tooth system 113', which cooperates with the gear tooth system in boundary surface 102" of assembly space 110. On its radially inner end, each toothed segment 113 mounts in the center a radially inward directed control cam 113", which cooperates with the contour of cam plate 111. Along its circumference from each of the two cavities 111', the cam plate 111 comprises a contoured section having initially an approximately constant radius, followed by a radially outward projecting step, and ending with a contoured control section 111", which extends slightly spirally outward with a constantly increasing radius. At the end of such a contoured control section 111", the contour of cam plate 111 merges into the next cavity 111', whereupon the contour pattern repeats itself by 180° out of phase.

Figure 7:
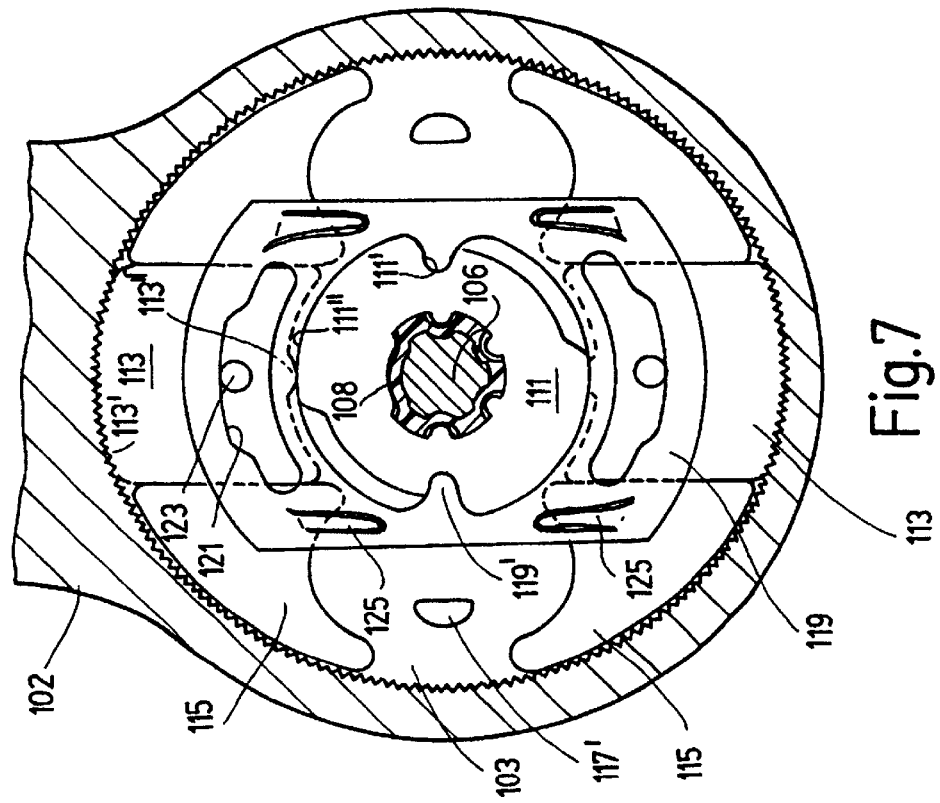
FIG. 7 is a radially sectioned view of the second embodiment in an engaged state.
Figure 9:
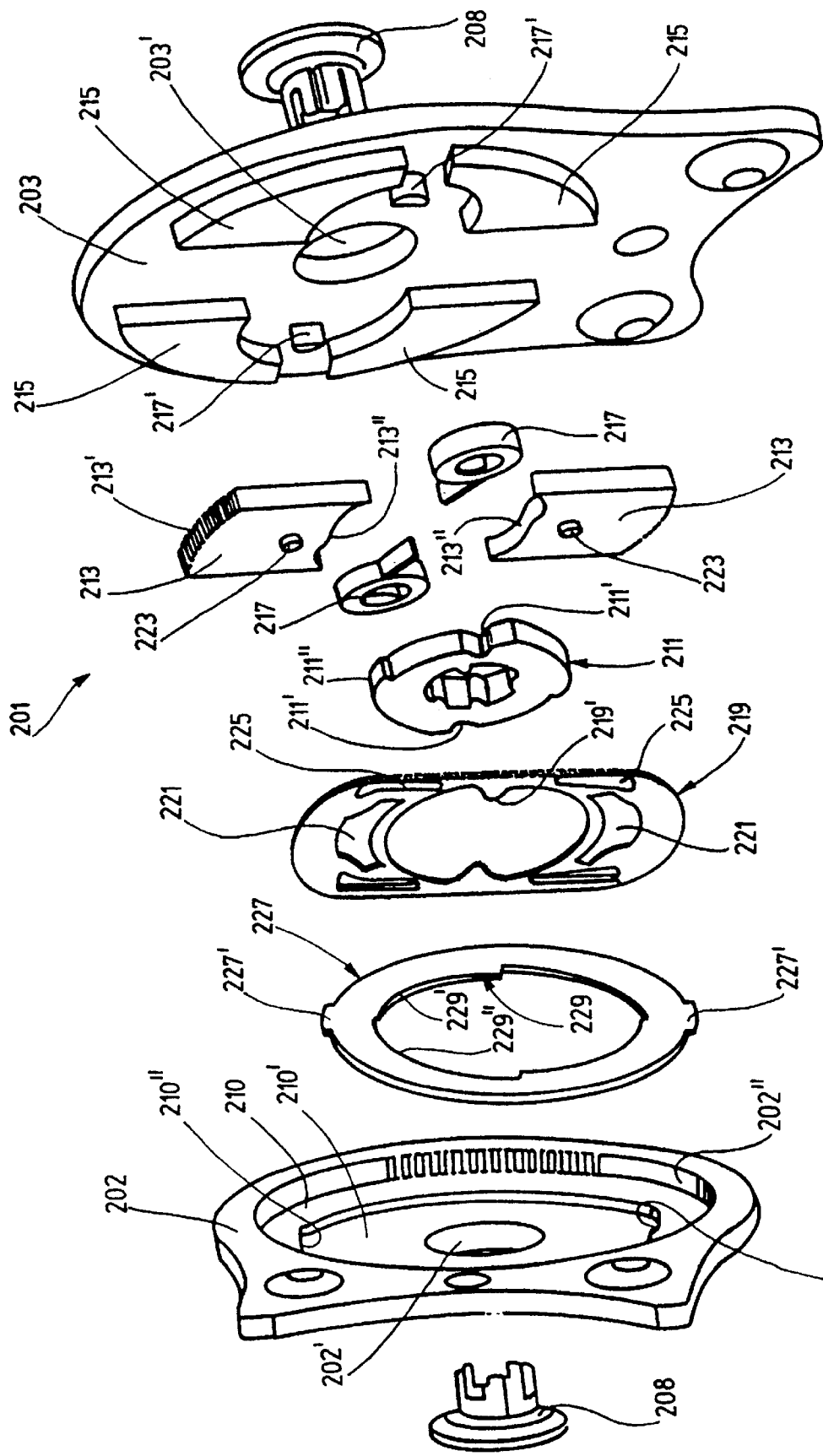
FIG. 9 is an exploded view of the individual components of a third embodiment, wherein the three components on the left are shown from a different perspective than the other components.
Figure 10:
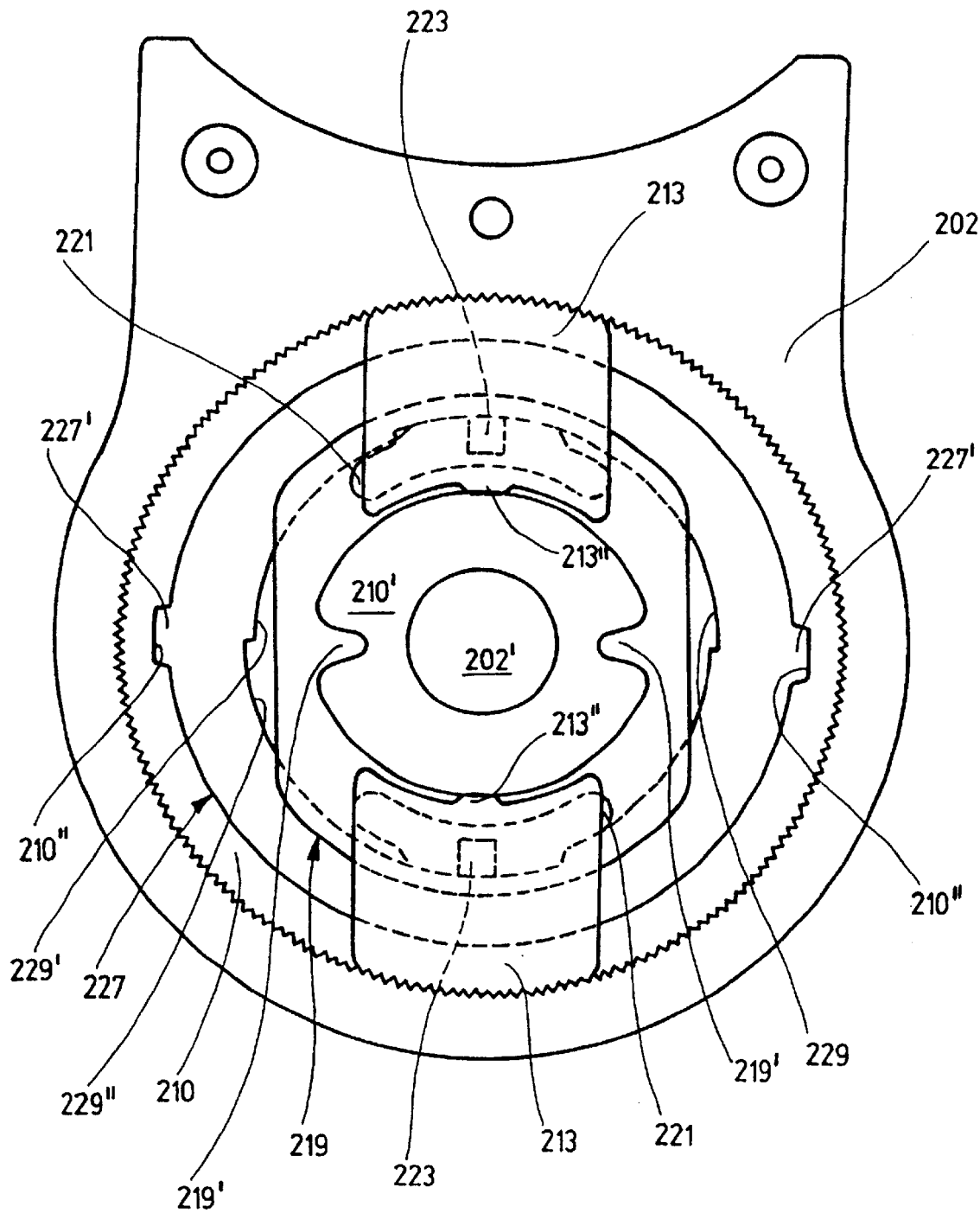
FIG. 10 is a view of the inner side of the upper member of the third embodiment with a ring, control disk, and toothed segments.
Figure 11:
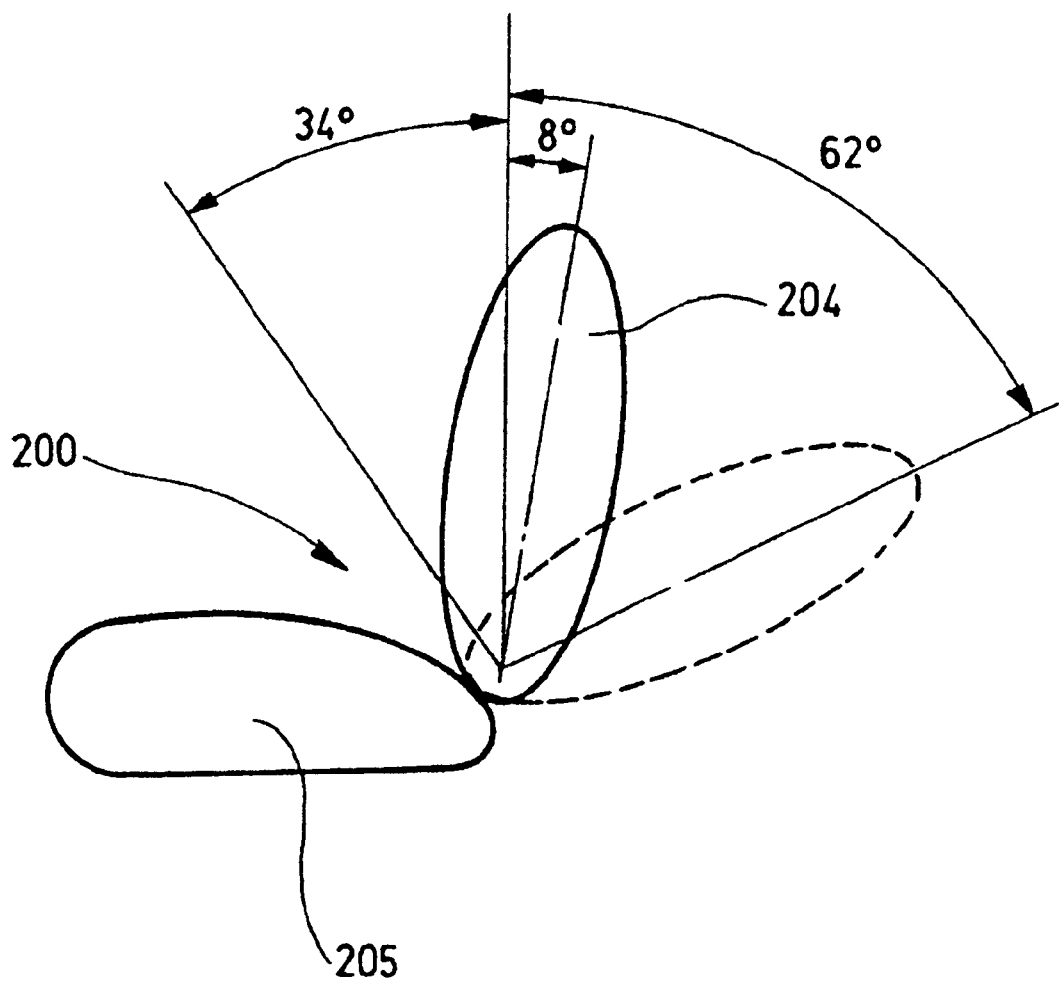
FIG. 11 is a side view of a typical automobile seat according to the third embodiment with a differently reclined seat back.
Figure 12:
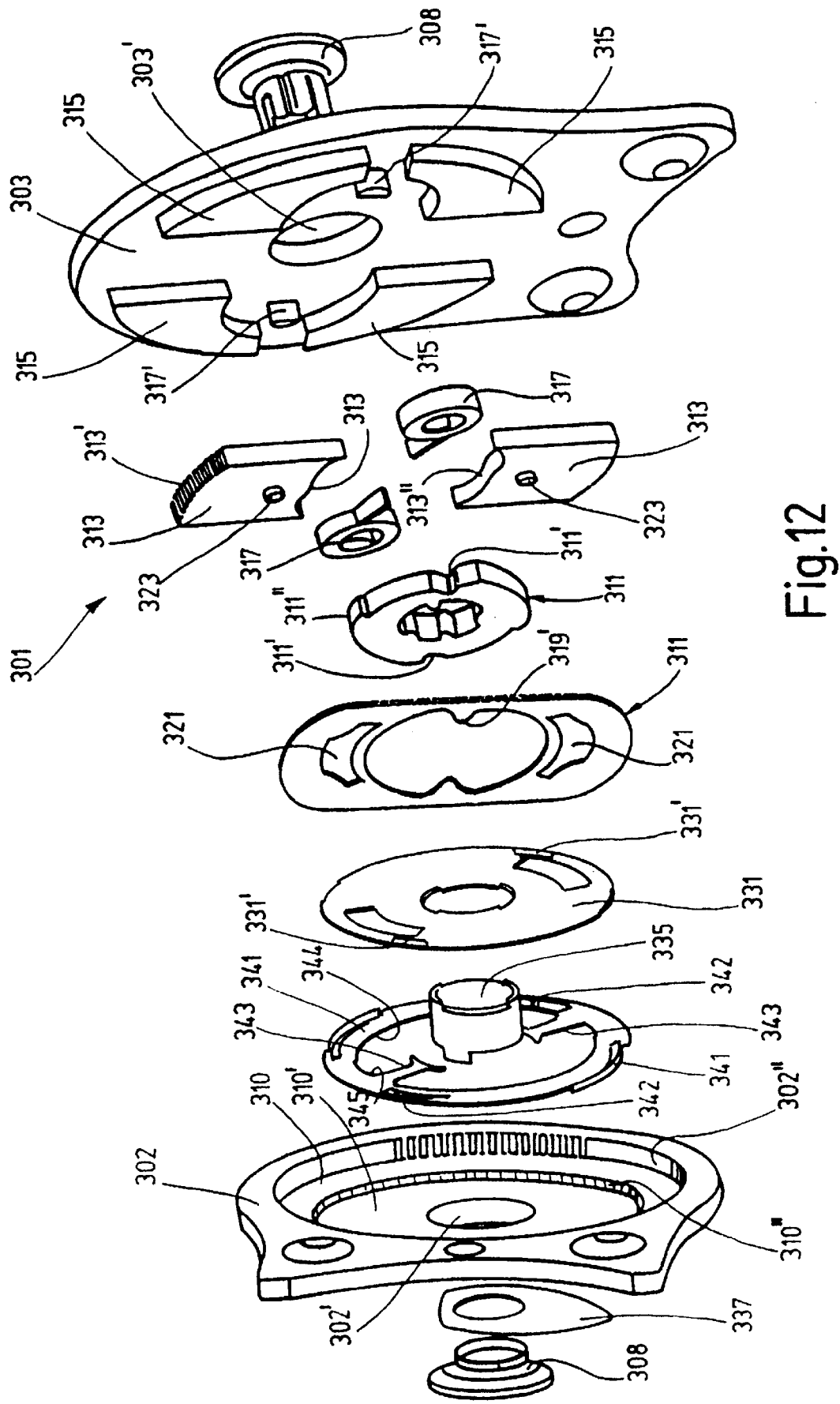
FIG. 12 is an exploded view of the individual components of a fourth embodiment, wherein the six components on the left are shown from a different perspective than the other components.
Figure 13:
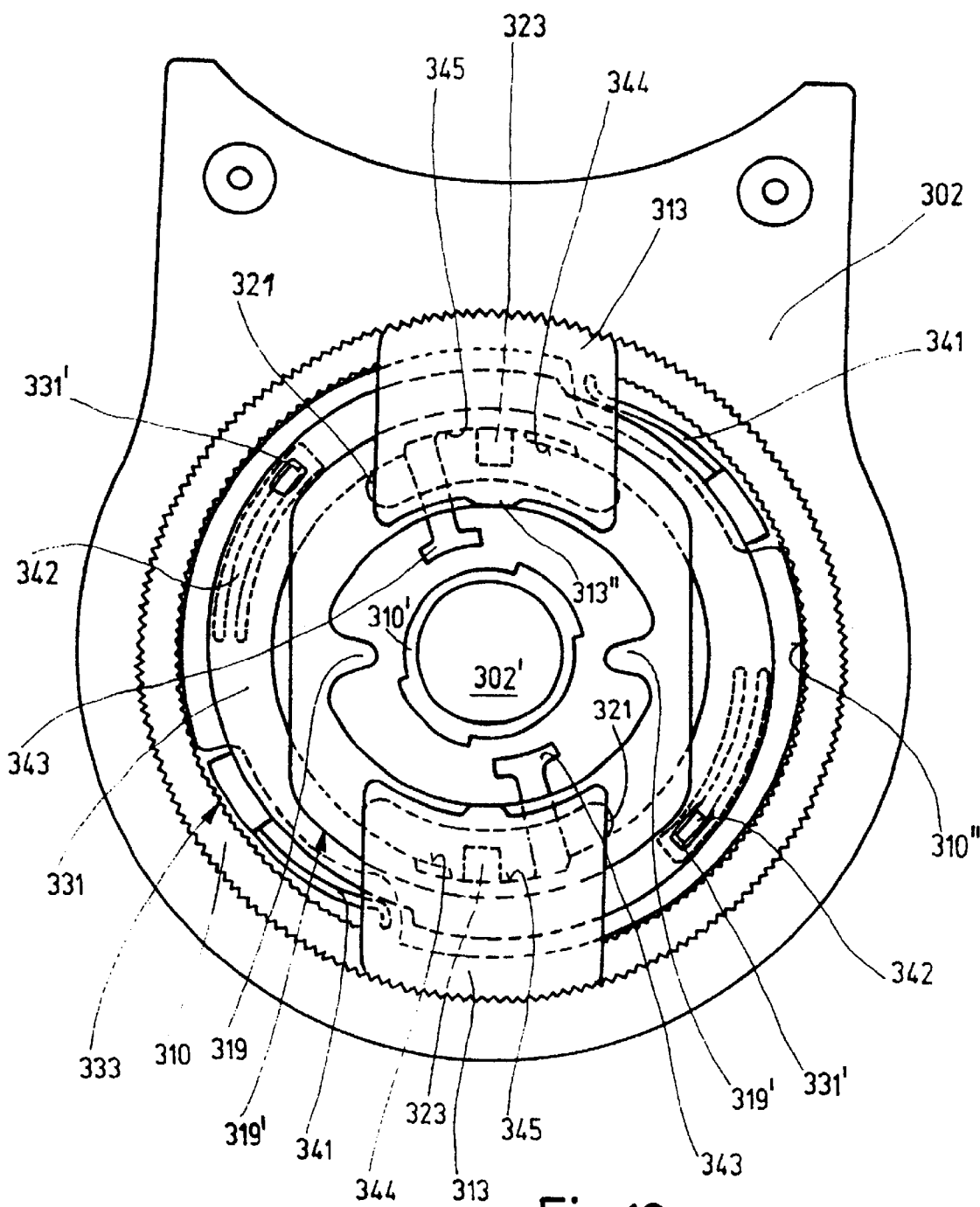
FIG. 13 is a view of the inner side of the upper member of the locking mechanism with a guide plate, shift plate, control disk, and toothed segments according to the fourth embodiment.

In a radially outer region, a pair of the guide segments 115 form a channel for each toothed segment 113, which lies with its parallel edge surfaces against the side walls of the channel. In their inner region perpendicular thereto, the guide segments offer a space for each spiral spring 117. With its inner end, each of the two spiral springs 117 is supported on a pin 117' of lower member 103, and with its outer end in cavities 111' on the circumference of cam plate 111. For the sake of clarity, FIGS. 7 and 8 show pins 117' without being surrounded by spiral springs 117.

A control disk 119 of a somewhat elongate shape is arranged within assembly space 110 between the upper member 102 of the mechanism and toothed segments 113. In its center, the control disk 119 is provided with a large opening, which surrounds cam plate 111. Two inward directed, opposite entraining elements 119' engage the two cavities 111' of cam plate 111, thereby supporting the control disk 119 nonrotatably on cam plate 111. In its radially outer region, the control disk 119 is provided with two arcuate slots 121 extending 180° out of phase. From each toothed segment 113, on its side facing upper member 102 of the mechanism, a detent 123 axially projects, which comes to lie, in the assembled state, within a slot 121. The further outward located edge of slots 121, which is relevant in the following, extends in a center region with a constant radius from the center of control disk 119, and laterally thereof it is offset inward closer to the center via a stepped transition.

Laterally of the two slots 121, the axially symmetrically constructed control disk 119 comprises a total of four resilient tongues 125, which are punched out of the material of the control disk 119, so that they are elastically connected to the remaining material only via one side, and which are then pushed out toward the upper member 102 of the mechanism. The control disk 119 is axially biased by the tongues 125, so that is remains in contact with the toothed segments 113, thereby further preventing an undesired rattling.

Figure 8:
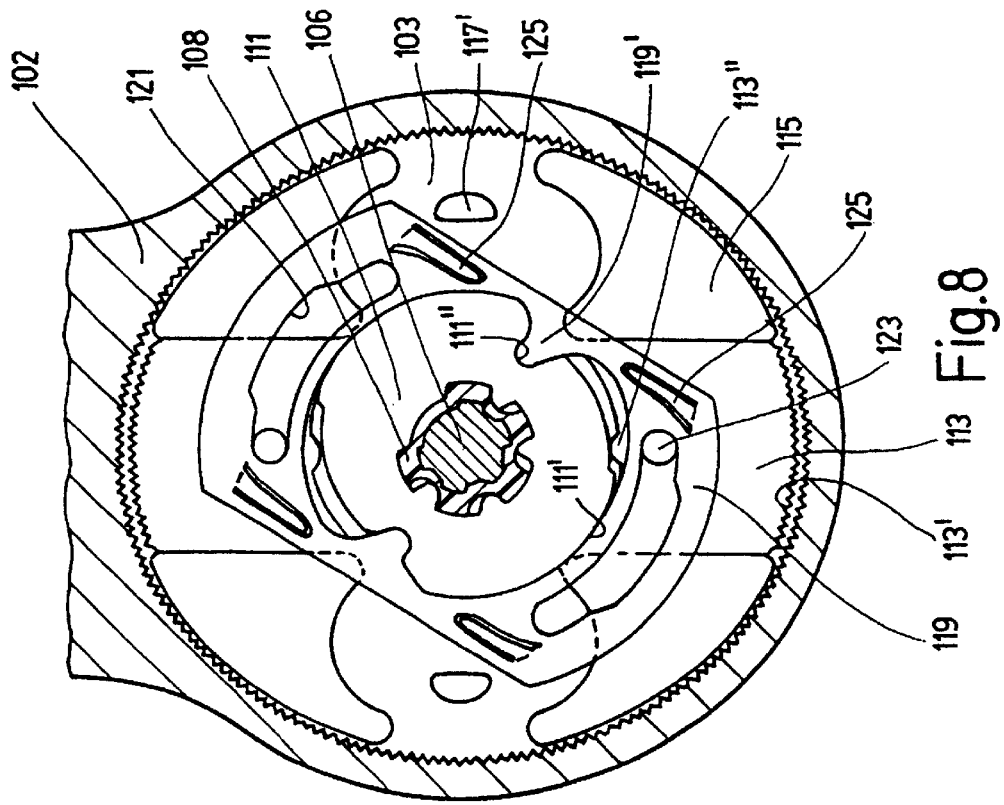
FIG. 8 is a radially sectioned view according to FIG. 7 in a disengaged state.

Proceeding from a disengaged state, as shown in FIG. 8, the axial safety device 108 is rotated along with transmission bar 106 by a rotation thereof. Between the outer profile of axial safety device 108 and the inner profile of cam plate 111, a play is provided, which compensates the tolerances of the two locking mechanisms 101 and the torsions of bar 106. Consequently, the cam plate 111 rotates with a delay along with axial safety device 108 and bar 106. In so doing, the spiral springs 117 assist the rotation of cam plate 111. With its transition rising toward each of the two contoured control sections 111", the cam plate 111 acting as a control component, presses against the corresponding control cam 113" of the toothed segment 113 associated thereto, which is thereby pushed radially outward. The control disk 119 being entrained via cavities 111' and noses 119', also rotates along with cam plate 111. In so doing, the detents 123 are pushed radially outward inside the slots 121 and simultaneously toward the center thereof.

Provided the upper member 102 of the mechanism is rotated such that its gear tooth system meshes with the gear tooth system 113' of toothed segments 113, the toothed segments, acting as locking elements, engage and lock the corresponding locking mechanism 101. In so doing, the toothed segments are biased by the contoured control sections 111' of cam plate 111. If in one of the two locking mechanisms 101, one tooth is in a tip-to-tip relationship with another tooth, the locking mechanism on the other side of the automobile seat will first engage due to the play provided between cam plate 111 and axial safety device 108. As a result of the natural movement of the seat user, the upper member 102 is moved along relative to the lower member 103 of the unlocked mechanism 101. As soon as a rotation has occurred by at most one half of the tooth width, the toothed segments 113 will also be able to engage in this mechanism. The different depths of engagement of the toothed segments 113 of the two locking mechanisms 101 are compensated by the tolerance-equalizing spiral shape of the contoured control sections 111".

From this engaged state, as shown in FIG. 7, the bar 106 is rotated in the opposite direction for purposes of disengaging, thereby entraining cam plate 111 via the axial safety device 108 against the force of spiral springs 117. The cam plate 111 rotates control disk 119, which pulls the toothed segments 113 further inward via its slots 121, in particular over the lateral transitional region toward the region located radially further inside, and furthermore via detents 123. The locking mechanism 101 is then disengaged, so that the respective upper member 102 of the mechanism can be rotated relative to its associated lower member 103. In this instance, the guide segments 115 lie with their circumferential outer surface against boundary surface 102" of assembly space 110, whereby the upper member 102 is directly supported on lower member 103 of the mechanism.

In the third embodiment, an automobile seat 200, which serves as a front seat of a two-door automobile, is provided with a locking mechanism generally indicated at 201. Unless otherwise specified in the following, the components of locking mechanism 201 correspond to the first and the second embodiment, and are therefore provided with numerals increased by 100 and 200 respectively.

Inside an annular cavity, which defines an assembly space 210, the upper member 202 of the locking mechanism comprises a further cavity 210', which enlarges assembly space 210. A boundary surface of assembly space 210, which is formed in the upper member 202 in the circumferential direction, is indicated at 202", and includes a gear tooth system. The configuration of the lower member 203 of the locking mechanism with guide segments 215 and pins 217', axial safety device 208, cam plate 211, toothed segments 213 with gear tooth system 213', spiral springs 217, and control disk 219 with entraining elements 219', slots 221, and tongues 225 is identical with that of the corresponding components of the second embodiment. The cavities of cam plate 211, which cooperate with entraining elements 219', are hereafter named receptacles 211', and the contoured control sections of cam plate 211 are referred to as contours 211".

Between the control disk 219 and upper member 202, a ring 227 is arranged below the cavity 210'. This ring 227 nonrotatably engages its two radial projections 227' in corresponding recesses 210" of cavity 210'. The thickness of ring 227 corresponds to the depth of cavity 210'. On its radially inner edge, the ring 227 comprises a stop track 229, which cooperates with the detents 223 of toothed segments 213. The radially symmetric stop track 229 consists of a radially further inward located first section 229' and a radially further outward located second section 229".

Starting with the disengaged state, a rotation of the transmission bar causes the axial safety device to rotate, which again rotates cam plate 211. In so doing, the spiral springs 217 assist the rotation of cam plate 211. With its contour 211", cam plate 211, which acts as a control element, pushes against the corresponding control cam 213" of its associated toothed segment 213, which is thereby pushed radially outward. As a result of an entrainment via receptacles 211' and entraining elements 219', the control disk rotates along with cam plate 211. In so doing, the detents 223 inside slots 221 are displaced radially outward.

Provided upper member 202 of the mechanism and, thus, ring 227 are in such an angular position that the detents 223 are oriented toward the radially further outward located, second section 229' of stop track 229, the toothed segments 213 that become operative as locking elements, engage and lock the corresponding locking mechanism 201. This angular position of stop track 229 corresponds to a position of the seat back 204 from 8° to 62° measured from the vertical rearward against the driving direction. For a disengagement, the transmission bar is rotated in the opposite direction, thereby entraining cam plate 211 via axial safety device 208 against the force of spiral springs 217. The cam plate 211 rotates control disk 219, which pulls toothed segments 213 radial inward via its slots 221 and, furthermore, via detents 223. The locking mechanism 201 is thus disengaged, so that its respective upper member 202 is able to rotate relative to its associated lower member 203 for adjusting the inclination of seat back 204. In this instance, the guide segments 215 lie with their circumferentially outer surface against boundary surface 202" of assembly space 210, whereby the upper member 202 of the mechanism is directly supported on the lower member 203.

During a free pivotal movement of seat back 204, a pull on a hand lever not shown causes at first the locking mechanisms 201 on both sides of the automobile seat 200 to disengage, and subsequently the respective upper member 202, and thus the seat back 204, to pivot forward relative to the corresponding lower member 203. As soon as the seat back 204 is inclined further forward than the above 8° to the vertical in the rearward direction, the detents 223 are oriented toward the radially further inward located first section 229' of stop track 229. If the hand lever is now released, the toothed segments 213 will be pushed radially outward by the force of spiral spring 217 only to such an extent that the detents 223 come into contact with the radially further inward located section 229' of stop track 229, which acts as a stop. In this instance, the toothed segments 213 are still so far removed with their gear tooth system 213' from the gear tooth system of upper member 202 of the mechanism that they are unable to lock. The free pivotal movement is forwardly restricted, for example, by a stop not shown, to a maximum angle of 34° from the vertical in the driving direction. Only when the detents 223 are again oriented toward the radially further outward located section 229" of stop track 229, while the seat back 204 is pivoted rearward at the above angle of 8°, will the toothed segments 213 be able to engage again.

In a manner corresponding to the situation during a free pivotal movement and while holding the hand lever, the seat back 204 is pivoted rearward by more than 62° from the vertical for reaching a reclined position, after disengaging the locking mechanisms 201. As soon as this angular position is exceeded, the detents 223 will again be oriented toward the radially further inward located section 229' of stop track 229, so that the toothed segments 213 are no longer able to lock. Only during a forward pivotal movement, will a locking engagement occur at the earliest at 62°.

In a modified embodiment, the ring 227 is not inserted into the locking mechanism 201, so that same will then operate in the same manner as the locking mechanism of the second embodiment.

The fourth embodiment relates to a locking mechanism, generally indicated at 301, for an automobile seat, which is used as the front seat of a two-door automobile. Unless otherwise specified in the following, the components of locking mechanism 301 correspond to the third, second, and first embodiments and are therefore provided with numerals increased by 100, 200, and 300 respectively.

An upper member 302 and a lower member 303 of the mechanism are provided with bores 302' and 303' respectively, through which an axial safety device 308 extends, which serves at the same time as a transmission element. Inside an annular cavity, which defines an assembly space 310, the upper member 302 comprises a further cavity 310', which enlarges the assembly space 310. A boundary surface of assembly space 310, which is formed in the upper member 302 and extends in the circumferential direction, is indicated as a first boundary surface at 302" and provided with a gear tooth system. A further boundary surface of cavity 310' extending further inside in the circumferential direction is indicated as a second boundary surface at 310" and likewise provided with a gear tooth system. A cam plate 311, which operates as a control element, is located within the assembly space 310 on axial safety device 308 in the plane with the boundary surface 302".

Two flat toothed segments 313 movable in the radial direction are arranged inside assembly space 310, and guided by four guide segments 315. Each toothed segment 313 comprises a gear tooth system 313', which cooperates with the gear tooth system in boundary surface 302", and a control cam 313", which cooperates with a contour 311" of cam plate 311. A pair of guide segments 315 form a channel for each toothed segment 313, and they offer in their interior region a space for each spiral spring 317. Each of the two spiral springs 317 is supported with its inner end on a pin 317' of lower member 303, and with its outer end in receptacles 311' of cam plate 311.

A control disk 319 of a somewhat elongate shape extends inside assembly space 310 between the upper member 302 and the toothed segments 313. The control disk 319 is nonrotatably supported on cam plate 311, in that two entraining elements 319' engage receptacles 311' of cam plate 311. In its radially outer region, the control disk 319 is provided with two opposite, arcuate slots 321, in which a detent 323 of each toothed segment 313 comes to lie in the assembled state.

Between the control disk 319 and the upper member 302 of the mechanism, the cavity 310' accommodates a disk-shaped shift plate 331 and an annular guide plate 333. The shift plate 331 is nonrotatably located on an actuation sleeve 335 by means of interlocking recesses. The actuation sleeve 335 surrounds axial safety device 308, and extends through bore 302' to the outside of lower member 302 of the mechanism. There, actuation sleeve 335 nonrotatably mounts a lever 337 by means of correspondingly interlocking recesses.

The guide plate 333 comprises three pairs of different spring arms 341, 342, and 343, which extend radially opposite to each other within a pair. The tongue-shaped, first spring arms 341 are formed on the outer circumference of guide plate 333 over an angular range of 60°, for example, by bending a portion of the outer edge region. The two first spring arms 341 operate radially outward, and in the engaged state of locking mechanism 301, they are spaced from the gear tooth system on the second boundary surface 310". The two second spring arms 342 are arranged offset from the first spring arms 341 in the circumferential direction and arranged radially further inside. The two second spring arms 342 are formed over an angular range of 60° in the fashion of bent tongues, for example, by being pressed out of guide plate 333. The two second spring arms 342 are operative in the axial direction toward the lower member 303 of the mechanism. In the engaged state of locking mechanism 301, the second spring arms 342 extend through cutouts 331' and then come to engage stamped portions of the lower member 303.

The two third spring arms 343 are offset from the first spring arms 341 and the second spring arms 342 in the circumferential direction, and produced, for example, by punching. The third spring arms 343 extend as individual arms radially inward from the radially inner edge of the annular guide plate 333. The third spring arms 343 make up for tolerances of the locking mechanism 301 in the axial direction, and ensure a correct axial position of guide plate 333. Between a flank of each of the third spring arms 343 and each step 344 of the radially inner edge of guide plate 333, respectively one cutout 345 is provided. In the engaged state of locking mechanism 301, the detents 323 extend through slots 321 of control disk 319 and corresponding openings of shift plate 331 into the cutouts 345 of guide plate 333.

In the case of a fine adjustment of the locking mechanism 301, the actuation lever 337, the actuation sleeve 335, shift plate 331, and guide plate 333 remain inactive. Starting with the disengaged state, a rotation of the transmission bar causes axial safety device 308 to rotate, which again rotates cam plate 311. In so doing, spiral springs 317 assist the rotation of cam plate 311. With its contour 311", cam plate 311 acting as a control element presses against the corresponding control cam 313" of the associated toothed segment 313, which is thereby pushed radially outward. As a result of being entrained via receptacles 311' and entraining elements 319', control disk 319 rotates likewise along with cam plate 311. In so doing, the detents 323 within the slots 321 are pushed radially outward. The toothed segments 313 becoming operative as locking elements engage the gear tooth system in the first boundary surface 302", and lock the corresponding locking mechanism 301.

For a disengagement, the transmission bar is rotated in the other direction, thereby entraining, via axial safety device 308, the cam plate 311 against the force of spiral springs 317. The cam plate 311 rotates control disk 319, which pulls the toothed segments 313 radially inward via its slots 321 and, furthermore, via the detents 323. In this instance, the locking mechanism 301 is disengaged, so that the respective upper member 302 can be rotated relative to the associated lower member 303 for adjusting the inclination of the seat back. In so doing, the guide segments 315 lie with their circumferentially outer surface against first boundary surface 302" of assembly space 310, whereby the upper member 302 is directly supported on the lower member 303 of the mechanism.

The free pivotal movement of the seat back is initiated by pulling lever 337, which then rotates actuation sleeve 335. The actuation sleeve 335 again rotates shift plate 331 with its cutouts 331'. As a result, the second spring arms 342 are pushed away from lower member 303 and out of the cutouts 331' of shift plate 331, so that the engagement between the guide plate 333 and the lower member 303 is discontinued. On its outer circumference, the shift plate 331 comprises two steps, which push due to the rotation, the first spring arms 341 into the gear tooth system of the second boundary surface 310" for purposes of coupling guide plate 333 with lower member 302 and storing the momentary position (memory position). At the same time, the shift plate 331 entrains control disk 319 with cam plate 311, for example, via a readjusted connecting piece. As in the case of disengagement of the locking mechanism 301, the toothed segments 313 are then retracted for a fine adjustment by slot 321 of control disk 319. The two detents 323 move out of cutouts 345 of guide plate 333 onto the two steps 344. It is now possible to pivot the seat back forward by rotating the locking mechanism 301, more specifically, upper member 302 and guide plate 333. A stop prevents shift plate 331 from inadvertently turning back.

If the lever 337 is now released, the toothed segments 313 remain radially pushed outward by the force of spiral springs 317 only so far as is permitted by the contact of detents 323 with the edge of slots 321 of the control disk 319 and with the steps 344 of guide plate 333. In this instance, the toothed segments 313 continue to be removed from the gear tooth system on the first boundary surface 302" of upper member 302 so far that they are unable to lock. The toothed segments 313 are moved closely over the gear tooth system of first boundary surface 302" of upper member 302.

When the seat back is again pivoted back to the preadjusted memory position, the detents 323 will enter a wider region of slots 321 and cutouts 345 of guide plate 333, so that they can be pushed radially outward by spiral springs 317 for engaging locking mechanisms 301. At the same time, the first spring arms 341 leave the steps on shift plate 331 and thus disengage from upper member 302. The second spring arms 342 are again able to extend through the cutouts 331' of shift plate 331 and to engage lower member 303. This causes guide plate 333 to disengage from upper member 302 and to engage the lower member of the mechanism.

If during the free pivotal movement, the seat back is inadvertently pushed rearward, the detents 323 will push against the third spring arms 343. If the force acting upon the guide plate 333 thereby becomes too great, the first spring arms 341 will disengage from the gear tooth system of the second boundary surface 310", and the guide plate 333 will be able to rotate freely, thereby protecting the locking mechanism 301 against damage.

In the locking mechanism of the present invention, it is possible to compose the different subassemblies of the described embodiments in combinations and subcombinations according to the modular construction system. For example, the locking mechanism may be designed and constructed such that it comprises both a ring according to the third embodiment and a guide plate according to the fourth embodiment.

NOMENCLATURE

| | |
|---|---|
| 1,101,201,301 | Locking mechanism |
| 2,102,202,302 | Upper member |
| 2',102',202',302' | Bore |
| 2",102',202",302" | (First) boundary surface |
| 3,103,203,303 | Lower member |
| 3',103',203',303' | Bore |
| 4,204 | Seat back |
| 5,205 | Seat structure |
| 6,106 | Transmission bar, bar |
| 8,108,208,308 | Transmission element, axial safety device |
| 8' | Flange section |
| 8" | Intermediate section |
| 8''' | Transmission section |
| 9 | Projections |
| 9' | Recesses |
| 10,110,210,310 | Assembly space |
| 11,111,211,311 | Control element, cam plate |
| 13,113,213,313 | Locking element, toothed segment |
| 13',113',213',313' | Gear tooth system |
| 15,115,215,315 | Guideway, guide segment |
| 17,117,217,317 | Spiral spring |
| 17',117',217',317' | Pin |
| 19,119,219,319 | Control disk, drive disk |
| 21,121,221,321 | Slot |
| 23,123,223,323 | Detent |
| 111' | Cavity (in cam plate) |
| 111" | Contoured control section |
| 113",213",313" | Control cam |

-continued

| | |
|---|---|
| 119'219',319' | Entraining element |
| 125,225 | Tongue |
| 200 | Vehicle seat |
| 210',310' | Cavity (in upper member) |
| 210" | Recess |
| 211',311' | Receptacle |
| 211",311" | Contour |
| 227 | Ring |
| 227' | Projection |
| 229 | Stop track |
| 229' | First section |
| 229" | Second section |
| 310" | Second boundary surface |
| 331 | Shift plate |
| 331' | Recess in shift plate |
| 333 | Guide plate |
| 335 | Actuation sleeve |
| 337 | Lever |
| 341 | First spring arm |
| 342 | Second spring arm |
| 343 | Third spring arm |
| 344 | Step |
| 345 | Cutout in guide plate |

What is claimed is:

1. A locking mechanism for a vehicle seat, comprising:
   an upper member;
   a lower member including a guideway having a bearing surface engaging the upper member so that the upper member is supported by the lower member and the upper and lower members are relatively rotatable about a central axis;
   two symmetrically arranged locking elements positioned between the upper member and the lower member and movable in opposite directions within the guideway radially away from the central axis so that the locking elements engage both the lower member and the upper member to restrict rotation of the upper member relative to the lower member;
   a cam plate for rotating about the central axis, wherein the locking elements are driven radially away from the central axis by the cam plate in response to rotation of the cam plate about the central axis, wherein the locking elements engage both the lower member and the upper member to restrict rotation of the upper member relative to the lower member while the locking elements are driven radially away from the central axis by the cam plate; and
   a control disk for rotating about the central axis, wherein the locking elements are drawn radially toward the central axis by the control disk in response to rotation of the control disk about the central axis.

2. A locking mechanism according to claim 1, wherein the cam plate and the control disk are formed as separate pieces.

3. A locking mechanism according to claim 1, wherein the upper member includes a peripheral boundary surface that at least partially defines a cavity in the upper member, and the peripheral boundary surface includes a gear rim for meshing with the locking elements while the locking elements are moved radially away from the central axis.

4. A locking mechanism according to claim 1, further comprising a bar for being rotated about the central axis, wherein the cam plate and the control disk are mounted for rotating with the bar.

5. A locking mechanism for a vehicle seat having a seat base and a seat back, the locking mechanism comprising:
   an upper member for being secured to the seat back;
   a lower member for being secured to the seat base, with one of the upper and lower members having a guideway which defines a generally circular bearing surface engaging and supporting the other member so that the upper member is supported by the lower member and the upper and lower members are relatively rotatable about a central axis which passes transversly through the upper and lower members, with the guideway further defining a radially directed channel;

a bar passing through the upper and lower members along the central axis for being rotated about the central axis;

a control element mounted for rotating with the bar;

a locking element within the channel of the guideway, wherein the locking element may be driven radially away from the central axis by the control element in response to rotation of the bar and the control element so that the locking element engages both the lower member and the upper member to restrict rotation of the upper member relative to the lower member; and a control disk for limiting the radial movement of the locking element, wherein the locking element has a lateral side that is positioned laterally to the radial movement of the locking element, the control disk lies against the lateral side of the locking element, and the control disk includes at least one tongue that functions for compensating for tolerances in the locking mechanism and for biasing in the direction toward the locking element.

6. A locking mechanism according to claim 5, wherein the guideway is part of the lower member, a gear rim for engaging the locking element is formed in a boundary surface of the upper member, and the locking element is a toothed segment for engaging the gear rim.

7. A locking mechanism according to claim 6, wherein the boundary surface of the upper member is a bearing surface that slidingly contacts the bearing surface of the guideway during relative rotation between the upper and lower members.

8. A locking mechanism according to claim 5, further comprising means for limiting the active operation of the locking element to predetermined angular positions between the upper and lower members.

9. A locking mechanism according to claim 8, wherein the guideway is part of the lower member, wherein the means comprises a stop track that is a separate piece from the upper member and is mounted for rotating with the upper member, and wherein the stop track extends angularly about the central axis so as to extend over a plurality of angular positions and includes a first section and a second section located radially further outward from the central axis than the first section, with the first section cooperating with a member of the locking element for limiting the radial movement of the locking element while the first section is proximate the channel of the guideway.

10. A locking mechanism according to claim 5, further comprising an element for engaging either the lower member or the upper member to permit free pivotal movement of the upper member relative to the lower member about the central axis and to permit for the return of the upper member to a predetermined position.

11. A locking mechanism according to claim 5, wherein the guideway is part of the lower member, wherein the locking mechanism further comprises a stop track that is a separate piece from the upper member and is mounted for rotating with the upper member, and wherein the stop track extends angularly about the central axis so as to extend over a plurality of angular positions and includes a first section and a second section located radially further outward from the central axis than the first section, with the first section cooperating with a member of the locking element for limiting the radial movement of the locking element while the first section is proximate the channel of the guideway.

12. A locking mechanism according to claim 5, wherein the tongue is a means for compensating for tolerances in the locking mechanism and for biasing in the direction toward the locking element.

13. A locking mechanism for a vehicle seat having a seat base and a seat back, the locking mechanism comprising:

an upper member for being secured to the seat back;

a lower member for being secured to the seat base, wherein a guideway is part of the lower member, and the guideway defines a generally circular bearing surface engaging and supporting the upper member so that the upper member is supported by the lower member and the upper and lower members are relatively rotatable about a central axis which passes transversly through the upper and lower members, with the guideway further defining a radially directed channel;

a bar passing through the upper and lower members along the central axis for being rotated about the central axis;

a control element mounted for rotating with the bar;

a locking element within the channel of the guideway, wherein the locking element may be driven radially away from the central axis by the control element in response to rotation of the bar and the control element so that the locking element engages both the lower member and the upper member to restrict rotation of the upper member relative to the lower member; and a stop track for limiting the active operation of the locking element to predetermined angular positions between the upper and lower members, wherein the stop track is a separate piece from the upper member and is mounted for rotating with the upper member, and wherein the stop track extends angularly about the central axis so as to extend over a plurality of angular positions and includes a first section and a second section located radially further outward from the central axis than the first section, with the first section cooperating with a member of the locking element for limiting the radial movement of the locking element while the first section is proximate the channel of the guideway.

14. A locking mechanism according to claim 13, further comprising means for compensating for tolerances in the locking mechanism.

15. A locking mechanism according to claim 14, further comprising a control disk for limiting the radial movement of the locking element, wherein the locking element has a lateral side that is positioned laterally to the radial movement of the locking element, the control disk lies against the lateral side of the locking element, and the control disk includes at least one tongue that functions as the means for compensating for tolerances in the locking mechanism and for biasing in the direction toward the locking element.

16. A locking mechanism according to claim 13, further comprising a control disk for limiting the radial movement of the locking element, wherein the locking element has a lateral side that is positioned laterally to the radial movement of the locking element, the control disk lies against the lateral side of the locking element, and the control disk includes at least one tongue that functions for compensating for tolerances in the locking mechanism and for biasing in the direction toward the locking element.

17. A locking mechanism according to claim 13, wherein the stop track is a means for limiting the active operation of the locking element to predetermined angular positions between the upper and lower members.

18. A locking mechanism for a vehicle seat having a seat base and a seat back, the locking mechanism comprising:
an upper member for being secured to the seat back;
a lower member for being secured to the seat base,
with one of the upper and lower members having a guideway which defines a generally circular bearing surface engaging and supporting the other member so that the upper member is supported by the lower member and the upper and lower members are relatively rotatable about a central axis which passes transversly through the upper and lower members, with the guideway further defining a radially directed channel;
a bar passing through the upper and lower members along the central axis for being rotated about the central axis;
a control element mounted for rotating with the bar;
a locking element within the channel of the guideway, wherein the locking element may be driven radially away from the central axis by the control element in response to rotation of the bar and the control element so that the locking element engages both the lower member and the upper member to restrict rotation of the upper member relative to the lower member; and
an element for engaging either the lower member or the upper member to permit free pivotal movement of the upper member relative to the lower member about the central axis and to permit for the return of the upper member to a predetermined position.

19. A locking mechanism according to claim 18, further comprising a shift plate, wherein the element has first arms for engaging the upper member and second arms for engaging the lower member, and the shift plate is operative for disengaging the first and second arms respectively from the upper and lower members.

20. An automobile seat, comprising:
a seat base;
a seat back; and
a locking mechanism connecting the seat back to the seat base and including:
an upper member mounted to the seat back,
a lower member mounted to the seat base, with the lower member including a guideway having a generally circular bearing surface engaging the upper member so that the upper member is supported by the lower member and the upper and lower members are relatively rotatable about a central axis, and the guideway defining a radially directed channel,
a bar passing through the upper and lower members along the central axis for being rotated about the central axis,
a control element mounted for rotating with the bar,
a locking element within the channel of the guideway, wherein the locking element may be driven radially away from the central axis by the control element in response to rotation of the bar and the control element so that the locking element engages both the lower member and the upper member to restrict rotation of the upper member relative to the lower member, and
a control disk for rotating about the central axis, wherein the locking element is drawn radially toward the central axis by the control disk in response to rotation of the control disk about the central axis.

21. An automobile seat according to claim 20, wherein the locking element has a lateral side that is positioned laterally to the radial movement of the locking element, the control disk lies against the lateral side of the locking element, and the control disk includes at least one tongue that functions for compensating for tolerances in the locking mechanism and for biasing in the direction toward the locking element.

22. An automobile seat according to claim 20, further comprising a stop, track mounted for rotating with the upper member, wherein the stop track extends angularly about the central axis so as to extend over a plurality of angular positions and includes a first section and a second section located radially further outward from the central axis that the first section, with the first section cooperating with a member of the locking element for limiting the radial movement of the locking element while the first section is proximate the channel of the guideway.

* * * * *